(12) United States Patent
Nishiyama et al.

(10) Patent No.: US 6,353,275 B1
(45) Date of Patent: *Mar. 5, 2002

(54) ROTOR WITH ADHESIVE FILLED GROOVES FASTENING INTERIOR PERMANENT MAGNETS

(76) Inventors: Noriyoshi Nishiyama, 15-27, Sugahara-cho, Izumiotsu-shi, Osaka, 595; Tomokazu Nakamura, 2-20-16, Kozu, Katano-shi, Osaka, 576, both of (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/170,702

(22) Filed: Oct. 13, 1998

(30) Foreign Application Priority Data

Oct. 13, 1997 (JP) .............................................. 9-278393
Oct. 13, 1997 (JP) .............................................. 9-278394

(51) Int. Cl.$^7$ ................................................. H02K 1/27
(52) U.S. Cl. .............................. 310/156.53; 310/156.21
(58) Field of Search ................................ 310/156, 216, 310/156.53, 156.21

(56) References Cited

U.S. PATENT DOCUMENTS

| | | | |
|---|---|---|---|
| 4,322,648 A | * 3/1982 | Ray et al. ................... | 310/156 |
| 4,486,679 A | 12/1984 | Jones ......................... | 310/218 |
| 4,954,736 A | * 9/1990 | Kawamoto et al. ......... | 310/156 |
| 5,159,220 A | * 10/1992 | Kliman ....................... | 310/156 |
| 5,363,004 A | * 11/1994 | Futami et al. .............. | 310/156 |
| 5,811,904 A | * 9/1998 | Tajima et al. ............... | 310/156 |
| 6,133,662 A | * 10/2000 | Matsunobu et al. ........ | 310/156 |

FOREIGN PATENT DOCUMENTS

| | | | | |
|---|---|---|---|---|
| JP | 5-236684 | * | 9/1993 | ................ 310/156 |
| JP | 05 236684 | | 10/1993 | |
| JP | 7-107687 | * | 4/1995 | ................ 310/156 |
| JP | 08-251846-a | * | 9/1996 | ........... 310/156.53 |
| JP | 8-251850 | | 9/1996 | |
| JP | 09 261901 | | 3/1997 | |

* cited by examiner

Primary Examiner—Karl Tamai
(74) Attorney, Agent, or Firm—Rossi & Associates

(57) ABSTRACT

A motor including a stator which has a plurality of teeth provided with windings on each of the teeth and a rotor which has permanent magnets inside the rotor, then the rotor includes a rotating shaft disposed at the center part, a rotor core fixed to the rotating shaft, permanent magnet slits formed inside the outer rim of the rotor core, grooves formed at the walls of the magnet slits, and the magnets inserted into the magnet slits. Then adhesive layers are formed in the magnet slits for sticking the magnets to the rotor core. In this structure, even if the size of the magnet slits and size of the magnet sections are substantially same, the adhesive remains at the grooves, so that the magnets are surely stuck to the rotor core. Also, by forming the grooves at the outer rotor rim side corners of the magnet slits, the magnetic flux short circuit of the magnets themselves and the possible travels of the magnetic flux into the adjacent magnets are suppressed. So that a highly reliable efficient motor with a high rotation speed is provided.

10 Claims, 6 Drawing Sheets

ROTOR WITH ADHESIVE FILLED GROOVES FASTENING INTERIOR PERMANENT MAGNETS

FIELD OF THE INVENTION

The present invention relates in general to motors for actuating air conditioners, industrial machines, electric vehicles, etc., and, more particularly, the invention relates to the structure of a motor having a rotor inside which permanent magnets are set so that reluctance torque as well as magnetic torque is utilized.

BACKGROUND OF THE INVENTION

A high efficiency motor which utilizes reluctance torque as well as magnetic torque by setting permanent magnets inside a rotor core, viz., so called "an interior permanent magnet motor" is already known. FIG. 9 is a cross sectional view showing the rotor of such conventional motor. In FIG. 9, the rotor is shaped into a cylinder having substantially the same shaft as that of a stator (not illustrated) and is supported by a bearing (not illustrated) for rotating on a shaft 76. The rotor has eight permanent magnet slits 73 inside a rotor 71, and these slits are disposed, along the rotating direction of the rotor, at the intervals of substantially same spacing and are extended through the core along the direction of the shaft. To the slits 73, an adhesive is applied, then plate shaped permanent magnets 72 are inserted, and the magnets 72 are stuck to the rotor core 71. With this structure, the rotor has eight magnetic poles.

The rotor is disposed inside the stator leaving a narrow annular clearance, then it is rotated by the attracting and repulsing force of the magnetic poles of the rotor to the stator teeth which have rotating magnetic fields created by the electric current which runs through the windings of the stator.

In the above structure, the relation between the inductance "Ld" of a d-shaft direction which meets at right angles with the magnetic poles of the rotor and the inductance "Lq" of a q-shaft direction which runs through the border between adjacent rotor magnetic poles is expressed as Lq>Ld.

Generally, the relation between a motor torque "T" and the parameters of the number of rotor magnetic pole pairs "Pn", an interlinkage flux "Ma", a stator winding current "I", an advanced phase angle (electrical angle) "b" of the current "I" to the induced voltage generated in each phase stator winding by the winding current "I" is expressed as, $$T=Pn\{Ma \cdot I \cdot \cos(b)+0.5(Lq-Ld)I^2 \cdot \sin(2b)\}$$

In the above equation, the first term represents a magnetic torque and the second term represents a reluctance torque. In the above described structure, Lq>Ld, so that by controlling to advance the phase of the winding current "I" to the phase of the induced voltage generated in each phase winding, thereby "b" becomes positive, then the reluctance torque is generated. By setting "b" at a predetermined value, the torque "T" can be made larger comparing that of only magnetic torque with the same electric current.

In the above described conventional structure, the rotor has the permanent magnet slits 73 in the rotor core 71, then the adhesive is applied to the walls of the slits 73, then the permanent magnets 72 are stuck inside the slits 73. Then, if the clearances between the slits 73 and the magnets 72 are large, the positions of the magnets 72 become unstable, then the magnetic flux disperses and the characteristic of the motor is deteriorated.

In addition, the big clearances cause the use of thick layers of the adhesive, whereby the effective magnetic flux decreases, which results in a decrease in the torque. Namely, if there are thick adhesive layers between the outer rotor rim 75 and the magnets 72, the magnetic resistance increases between them, so that the magnetic flux, which is produced by magnets 72 and runs into the stator, decreases, then the magnetic torque decreases and the output power of the motor also decreases.

Therefore, stabilization of the positions of the magnets 73 is tried by decreasing the clearances between the slits 73 and the magnets 72 by adjusting the section size of the magnets 72 and that of the inserting openings of the slits 73 to be substantially the same.

However, if the clearances between the walls of the slits 73 and the magnets 72 are small, the insertion of the magnets 72 is difficult and also the adhesive applied to the walls of the slits 73 is pressed out when the magnets 72 are inserted into the slits 73. Accordingly, the adhesive layers between the walls of the slits 73 and the magnets 72 mostly disappear, causing concern as to whether the magnets 72 are firmly stuck inside the slits or not. Also, if the adhesive layers are not thick enough, the motor may loose reliability on the problem of the dropping out of the magnets 72 at high speed rotation.

The rotor of "the interior permanent magnet motor" is driven not only by the magnetic torque, which directly contributes for generating the torque by the magnetic flux which is produced by magnets 72 and runs into the stator, but also the motor is driven by utilizing the reluctance torques which is generated by the above described difference between the inductance "Ld" and the inductance "Lq". While if the space of the outer rotor rim 75 between the magnets 72 and the outer rim edge of the rotor core 71 is narrow, the magnetic flux path becomes also narrow, then the magnetic saturation occurs, and the volume of the magnetic flux which runs there decreases and the reluctance torque becomes small.

It has been suggested to dispose the magnets 72 at positions closer to a shaft 76 for taking wider space of the outer rotor rim 75, and then for making a larger magnetic flux path so that the magnetic flux runs well and that the large reluctance torque is utilized. However, in that case, the ends of the magnets 72 are more separated from the outer rim edge of the rotor core 71, then the magnetic flux runs into the adjacent magnets, and the effective volume of the magnetic flux for generating the torque decreases.

While, the structure for preventing the pressing out of the adhesive when permanent magnets are stuck to the rotor of a motor is stated in the Japanese Patent Application Unexamined Publication No. H08-251850. The rotor, as illustrated in FIG. 10, has a groove 84 for absorbing the excess of an adhesive 88 applied to a portion where a cylindrical permanent magnet 82 is stuck to a shaft 86. In the illustration, the thickness of the adhesive layer 88 is enlarged.

However, the structure is not the one in which the permanent magnet is set inside a rotor, but it is the one in which the cylindrical permanent magnet 82 is stuck to the surface of the shaft 86 with an adhesive, that is so called "a surface permanent magnet motor", namely that is the motor in which the permanent magnet 82 is just stuck to the shaft 86 with the adhesive.

SUMMARY OF THE INVENTION

The present invention aims to provide "an interior permanent magnet motor" having a rotor which has permanent magnets stuck surely inside it so that the reliability is improved, and the rotor also has wide outer rotor rim space between the permanent magnets and the outer rotor rim edge for providing a wide magnetic flux path, still the travels of the magnetic flux into the adjacent magnets are suppressed, so that the efficiency is also improved.

Namely, the present invention provides a motor comprising a stator having a plurality of teeth provided with windings and a rotor including interior permanent magnets, then the rotor has a rotating shaft disposed at the center part, a rotor core fixed to the rotating shaft, permanent magnet slits formed inside the outer rim of the rotor, grooves formed at the walls of the slits, the magnets inserted into the slits, and adhesive layers inside the slits to stick the magnets to the rotor core.

With the structure described above, even if the size of the permanent magnet slits and the section size of the inserted permanent magnets are adjusted to be substantially same, the adhesive remains at least in the grooves, so that the magnets are surely stuck to the rotor core. Also in the present invention, by forming the portions of low magnetic induction at the outer rotor rim side corners of the permanent magnet slits, the travels of the magnetic flux into the adjacent magnets are suppressed, so that the efficient motor is realized.

By forming the grooves at the outer rotor rim side corners of the permanent magnet slits, and by filling up the grooves with the adhesive of low magnetic induction, the magnets are surely stuck to the rotor core and also the travels of the magnetic flux into the adjacent magnets are suppressed, which is extremely efficient.

DESCRIPTION OF THE PREFERRED EMBODIMENTS

Figure 1:
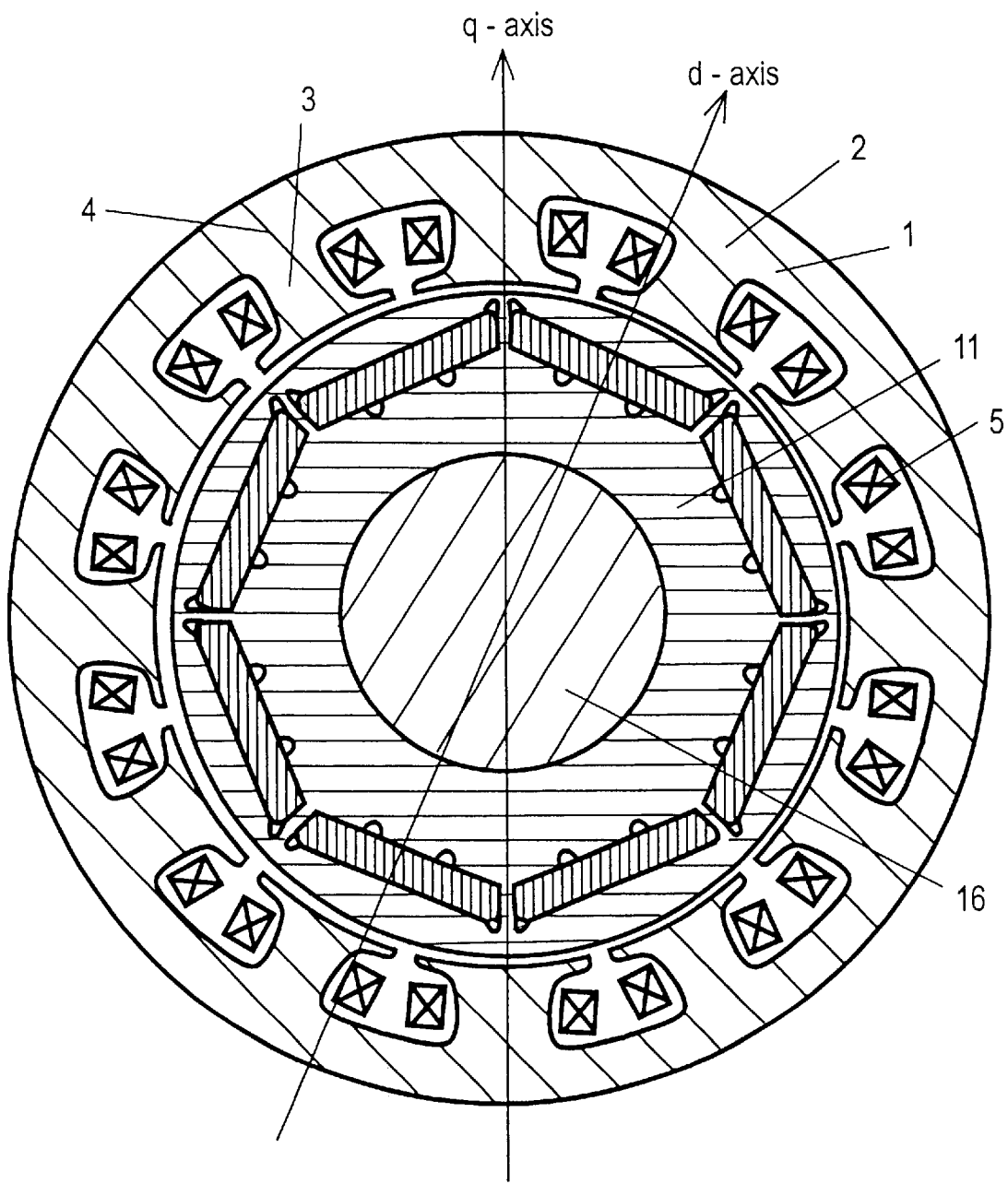
FIG. 1 is a cross sectional view showing a motor of a first exemplary embodiment of the present invention.
Figure 2:
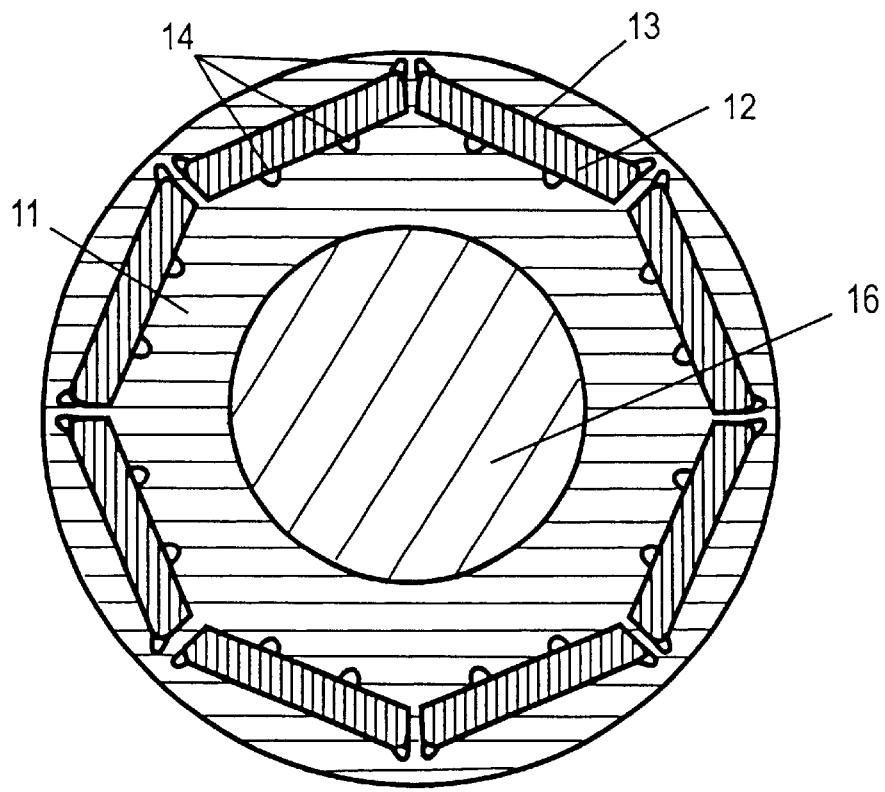
FIG. 2 is a cross sectional view showing a rotor of the first exemplary embodiment of the present invention.
Figure 3:
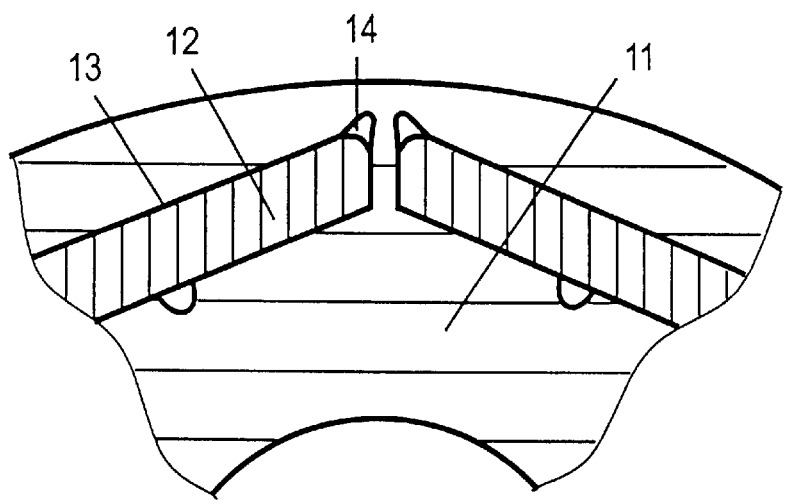
FIG. 3 is a partially enlarged cross sectional view of the rotor illustrated in FIG. 2.

In the following, explanation on the exemplary embodiments of the present invention is described referring to the attached drawings.
First exemplary embodiment:

FIG. 1 is a cross sectional view showing a motor of the first exemplary embodiment of the present invention. FIG. 2 shows a cross sectional view of a rotor of the motor of FIG. 1. FIG. 3 is a partially enlarged cross sectional view of the rotor illustrated in FIG. 2.

In FIG. 1 through FIG. 3, a stator 1 is formed by laminating a plurality of stator cores 2 made of annular magnetic plates, and comprises a plurality of teeth 3 and a yoke 4 for connecting the roots of the teeth. The teeth 3 are provided with windings 5.

The rotor is shaped into a cylinder having substantially the same shaft with the stator 1 and is disposed inside the stator leaving annular clearance. At the center part of the rotor, a rotating shaft 16 is fixed to the rotor, and the rotor is supported by a bearing (not illustrated) for rotating on the shaft 16. The rotor has eight permanent magnet slits 13 formed inside a rotor core 11, and these slits are disposed, along the rotating direction of the rotor, at the intervals of substantially same spacing and are extended through the core along the direction of the shaft. Into the slits, plate shaped permanent magnets 12 are inserted, then eight rotor magnetic poles are created. The rotor is rotated by the attracting and the repulsing force of the magnetic poles of the rotor to the stator teeth 3 which have rotating magnetic fields created by the electric current which runs through the stator windings 5.

Into the permanent magnet slits 13, rectangular permanent magnets 12, whose section size is almost same as that of the slits 13, are inserted and are stuck inside the slits 13. At the walls of the slits 13, grooves 14 are formed, and the grooves 14 are filled up with an adhesive made of non-magnetic material for forming adhesive layers for sticking the magnets 12 to the rotor core 11.

As described above, by forming the grooves 14 at the walls of the slits 13 in which magnets 12 are inserted, even if the size of the slits 13 and the section size of the magnet 12 are adjusted to be substantially same (naturally the magnets 12 are little smaller), the adhesive applied to the walls of the slits 13 remains at least at the grooves 14 without being pressed out by the inserted magnet 12, so that the magnets 12 are stuck to the rotor core 11 with the remaining adhesive.

Referring to FIG. 3, the details of a rotor core 11 will now be explained. The grooves 14 are formed at the inside slit 13 wall facing the inner rim of the rotor core and also at both slit 13 corners facing the outer rim of the rotor core, wherein the grooves have a cone shaped cross section with a rounded tip protruding toward the outer rim of the rotor in a radial direction as shown in FIG. 3. The reason why the grooves 14 are formed at the outer rotor rim side corners of the slits 13 is as follows.

Each of the magnets 12 has different polarities between the inner core rim side and the outer rotor rim side, so that there is the possibility of the magnetic flux short circuit of magnets 12 themselves. However, with the grooves 14 illustrated in FIG. 3, the magnetic flux short circuit at the ends of the magnets 12 from one side to the other side of the magnets is suppressed. By forming the grooves protruded to the outer rotor rim side, the suppression of the short circuit at the magnet ends becomes more effective and also the travels of the magnetic flux into the adjacent magnet, namely the magnetic flux leakage is decreased. Then, the effective magnetic flux, which is produced by the magnets 12 and contributes for generating torque by running into the stator 1 through the outer rotor core rim, increases.

If the formed grooves 14 are emptied, the strength of the rotor decreases, then there is the possibility of occurrence of a problem, for instance, at high speed rotation. In that case, by filling up the grooves 14 with the adhesive, the strength increases at the grooves 14 where the stress is concentrated during rotation, then the rotor withstands the high speed rotation.

It is also better for the magnets 12 inserted into the slits 13 and the rotor core 11 be in contact as much as possible. If there is an adhesive between the magnets 12 and the outer rotor rim side walls of the slits, the distance between the magnets 12 and the stator 1 becomes longer. Also, since the adhesive is generally non-magnetic material, if there is adhesive between the magnets 12 and the outer rotor rim side walls of the slits 13, the magnetic resistance increases, so that the magnetic flux, which is produced by the magnets 12 and runs into the stator 1, decreases.

If the magnets 12 and the rotor core 11 are contacted in at least one position, the decrease of the magnetic flux is suppressed. If the magnets 12 and the outer rotor rim side walls of slits 13 are solidly contacted, it is better. Further, if the magnets 12 and whole walls of each of the slits 13 are contacted except the portions of the grooves 14, it is still better from the stand point of generating the magnetic torque.

If the grooves 14 in the slits 13 are formed at both slit 13 corners facing the outer rim of the rotor core and at inner core rim side walls, the effective magnetic flux volume for generating the reluctance torque is not decreased for driving the motor utilizing the reluctance torque. Also even when the grooves 14 are formed at only inner core rim side walls of the slits 13, good effect is obtained.

Also, when the grooves 14 are formed extending along the direction of the rotor shaft, the adhesive filled in each groove spreads through the groove, so that the adhesive layers are surely formed.

Figure 4:
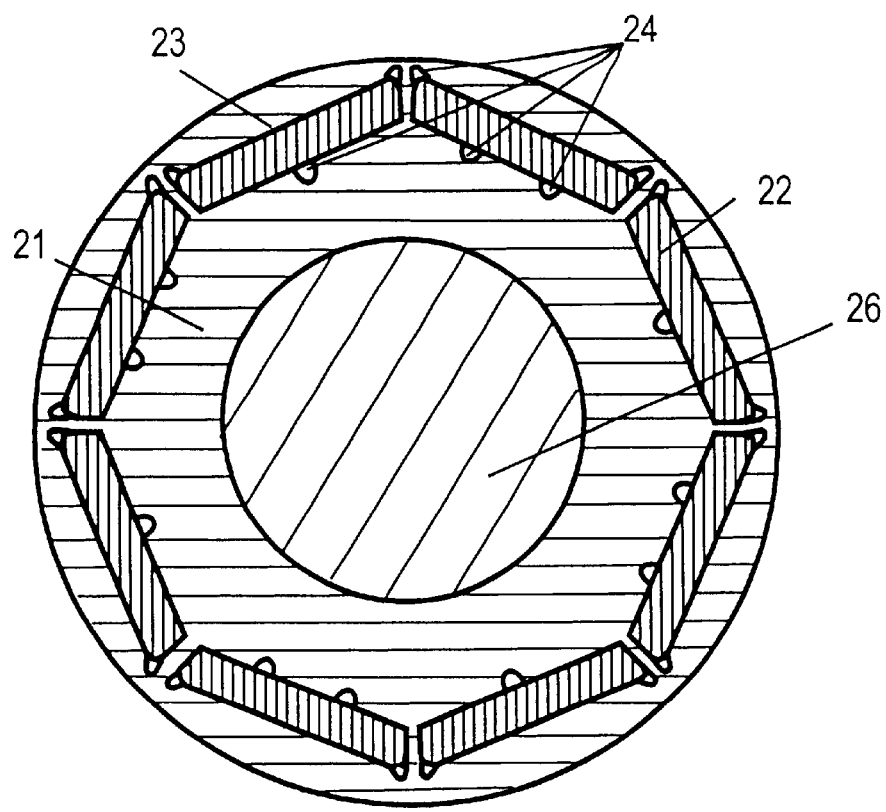
FIG. 4 is a cross sectional view showing a rotor of a second exemplary embodiment of the present invention.

Second Exemplary Embodiment:

FIG. 4 is a cross sectional view showing the second exemplary embodiment of the present invention.

In FIG. 4, a rotor core 21 is fixed to a rotating shaft 26, and grooves 24 are formed at the walls of permanent magnet slits 23, then at the grooves 24, adhesive layers are formed for sticking permanent magnets 22 inside the slits 23 of the rotor core 21.

In the following, detailed explanation is described on the grooves 24. The grooves are formed at both slit 23 corners facing the outer rim of the rotor core, and also one groove and two grooves are alternately formed at each of the inner core rim side walls of the slits 23, along the rotating direction of the rotor. The rotor core 21 is formed as follows. A plurality of rotor core sheets made of magnetic plates are prepared, then on each of the sheets, the slits 23 and the grooves 24 are formed. The grooves 24 are formed at both slit 23 corners facing the outer rotor rim of the rotor core, and also one groove and two grooves are alternately formed at the inner core rim side wall of each of the slits 23 along the rotating direction of the rotor. Then the core sheets are laminated along the direction of the shaft, and each adjacent sheet is rotated by a predetermined angle so that each slit 23 agrees with each other.

Figure 5:
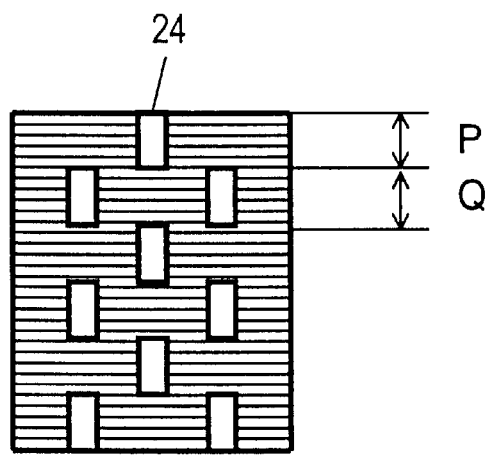
FIG. 5 shows a wall of a slit for a permanent magnet of the second exemplary embodiment of the present invention.

Further details are explained in the following referring to FIG. 5. The above described rotor core sheets are made, for instance, by pressing piece by piece. Then the sheets are laminated to the thickness unit of "P" and "Q" as shown in the illustration. Then the rotor core is formed by laminating these units, along the direction of the shaft, rotating each adjacent unit by the angle of permanent magnet disposition, namely in this exemplary embodiment 45° (360°/the number of rotor poles). Then by applying the adhesive to the grooves 24, enough adhesive layers are formed and the magnets 22 are surely stuck inside the slits 23.

As above described, a plurality of the grooves 24 are formed at the inner core rim side walls of the slits 23. In this structure, the grooves 24 are widely spread, so that the adhesive layers formed in the grooves 24 are evenly disposed.

As in this exemplary embodiment, by forming the rotor core 21 with the method of laminating, along the shaft direction, rotated magnetic plates which has the different number of grooves on at least two different side walls of each of the slits 23, the grooves can be widely disposed with ease.

The number of the grooves formed at inner core rim side walls is not limited to one or two, namely the number can be determined according to the necessity.

Also by forming the grooves 24 at the outer rotor rim side corners of the slits 23, the magnets 22 are more surely stuck to the rotor core 21.

Figure 6:
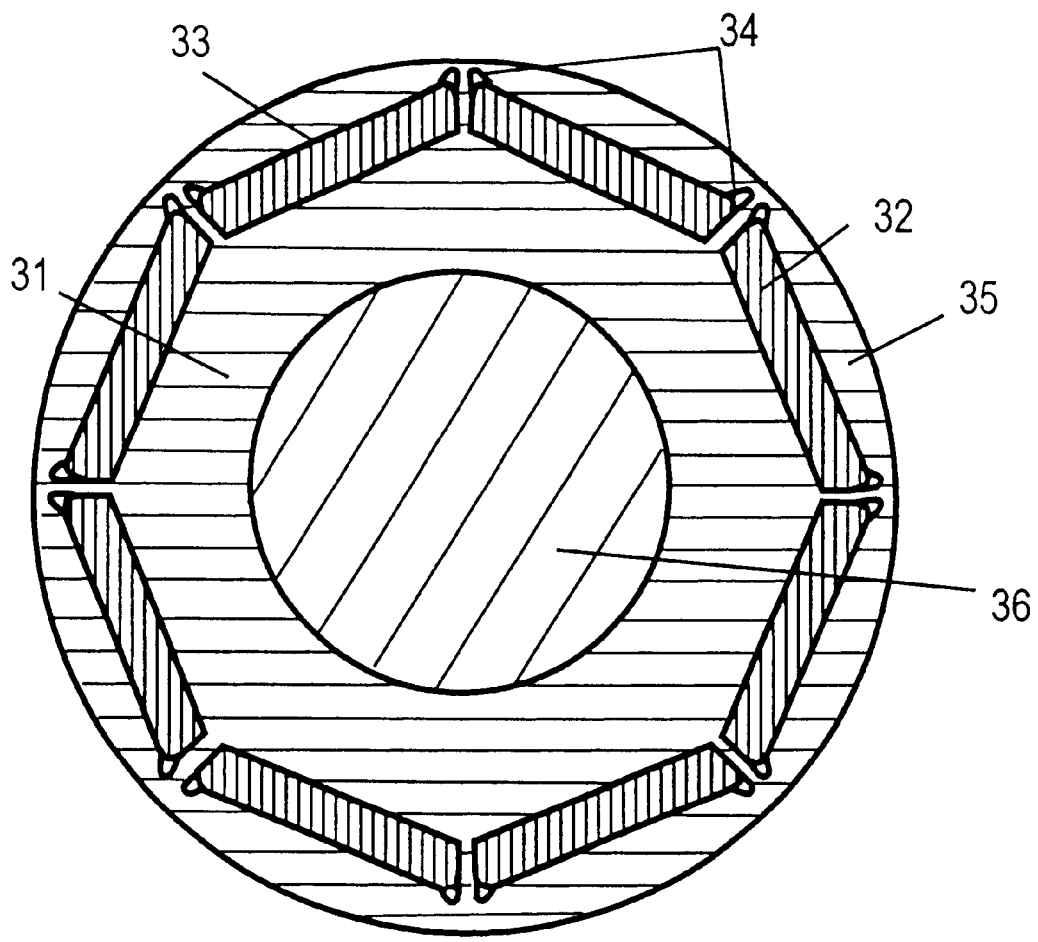
FIG. 6 is a cross sectional view showing a rotor of a third exemplary embodiment of the present invention.

Third Exemplary Embodiment:

FIG. 6 is a cross sectional view showing the third exemplary embodiment of the present invention. In FIG. 6, a rotor is formed by laminating magnetic plates, and the rotor has a rotor core 31 fixed to a rotating shaft 36, permanent magnet slits 33 formed inside the outer rim of the rotor core 31, and plate shaped magnets 32 whose section is rectangular. The magnets 32 are stuck inside the slits 33 with an adhesive applied to the slits 33.

As shown in FIG. 6, in another preferred embodiment of the invention, the plate shaped permanent magnets 32 have a trapezoidal cross section. Permanent magnet slits 33 having a trapezoidal cross section are formed inside the outer rim of the rotor core 31. Each slit 33 has a longer parallel side, a shorter parallel side, two beveled end sides, and four slit corners, and the longer parallel side is located radially outwards of the shorter parallel side. Grooves of low magnetic induction 34 protrude from the slit corners facing the outer rim of the rotor core, and a plate thickness of each of the permanent magnets 32 is minimized at these slit corners. The groover 34 are formed in a V shaped cross section having a base and a rounded tip, and each groove 34 is oriented so that the base extends between one of the beveled end sides and the longer parallel side of the slit and the tip is located radially outwards of the base.

Also, even though the space of the outer rotor rim 35 between the slits 33 and the outer rotor rim edge is taken wide for running the big volume of the magnetic flux from the stator to generate reluctance torque effectively, the grooves at both rotor rim side corners of the slits 33 suppress the travels of the magnetic flux into the adjacent magnets.

By disposing the rotor having the structure as above described in a stator, "the interior permanent magnet motor" which utilizes effectively reluctance torque as well as magnetic torque, is realized.

The grooves 34 may be left empty, but it is better that these are filled up with an adhesive to increase the strength of the rotor. By filling up the grooves 34 with an adhesive, the magnets 32 are stuck to the rotor core 31 with the adhesive layers in the grooves, even if the size of the slits 33 and the section size of the magnets 32 are adjusted to be substantially the same (naturally the magnets 32 are little smaller than the slits 33). Namely, when both sizes are almost same, there is possibility that the adhesive applied to the slits 33 is pressed out when the magnets 32 are inserted into the slits 33. However, by filling up the grooves 34 with the adhesive, at least the adhesive in the grooves 34 remains and the remaining adhesive surely sticks the magnets 32 to the rotor core 31.

Regarding the outer rotor rim side, it is preferable to form the grooves 34 only at the corners of the slits 33. For instance, if the grooves are formed at the center part of the outer rotor rim side wall of each of the magnet slits 33, the magnetic flux is intercepted by the grooves. In addition, the magnets 32 and the walls of the slits 33 are better to be contacted as much as possible except the portions of grooves 34. The reason is that if there are adhesive layers between the magnets 32 and the slits 33 other than the portions of the grooves 34, the magnetic resistance between the magnets 32 and the outer rotor rim 35 increases, so that the magnetic flux volume, which is produced by the magnets 32 and runs to the outer rotor rim 35, decreases. Therefore, it is preferable that there is no adhesive layer between the magnets 32 and the outer rotor rim side walls of the slits 33 except the portions of the grooves 34 and also it is better that each of the magnets 32 and the outer rotor rim 35 are contacted directly at least at one portion.

With the structure described above, the magnetic resistance between the magnets 32 and the outer rotor rim 35 becomes small, then the magnetic flux produced by the magnets 32 effectively runs to the outer rotor rim 35, then runs into the stator through the annular clearance between the rotor and the stator, and contributes effectively for generating the torque.

Figure 7:
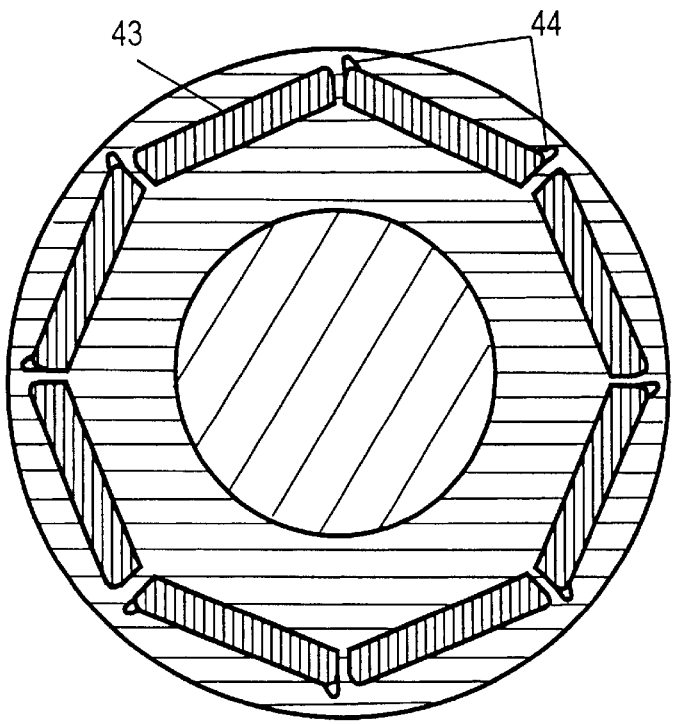
FIG. 7 is a cross sectional view showing a rotor of a fourth exemplary embodiment of the present invention.

Fourth Exemplary Embodiment:

FIG. 7 is a cross sectional view showing the fourth exemplary embodiment of the present invention. The difference from the third exemplary embodiment is that, in this exemplary embodiment, there are two types of permanent magnet slits 43 which are alternately disposed along the rotating direction of a rotor, one type has grooves 44 at both slit 43 corners facing the outer rim of the rotor core, and the other type has no groove. With this structure also, as in the third exemplary embodiment, the travels of the magnetic flux into the adjacent magnets 43 are suppressed by the grooves 44, so that effective reluctance torque is obtained.

Figure 8:
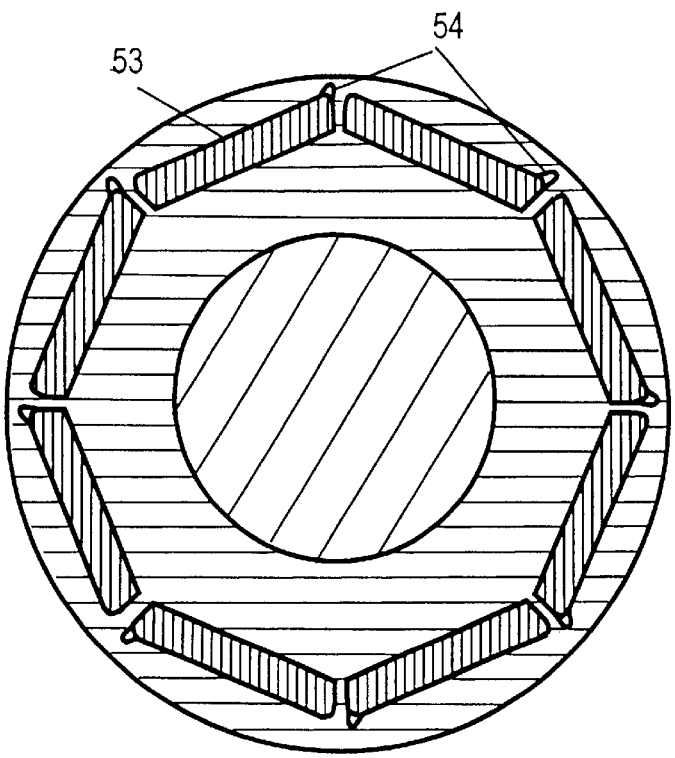
FIG. 8 is a cross sectional view showing a rotor of a fifth exemplary embodiment of the present invention.
Figure 9:
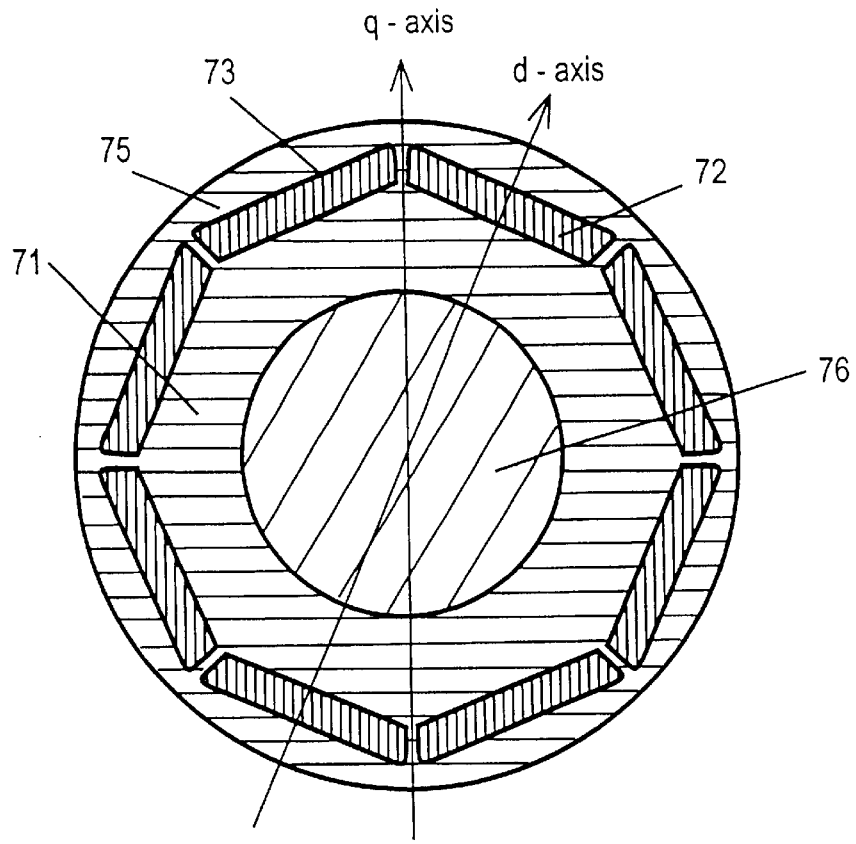
FIG. 9 is a cross sectional view showing a rotor of a conventional example.
Figure 10:
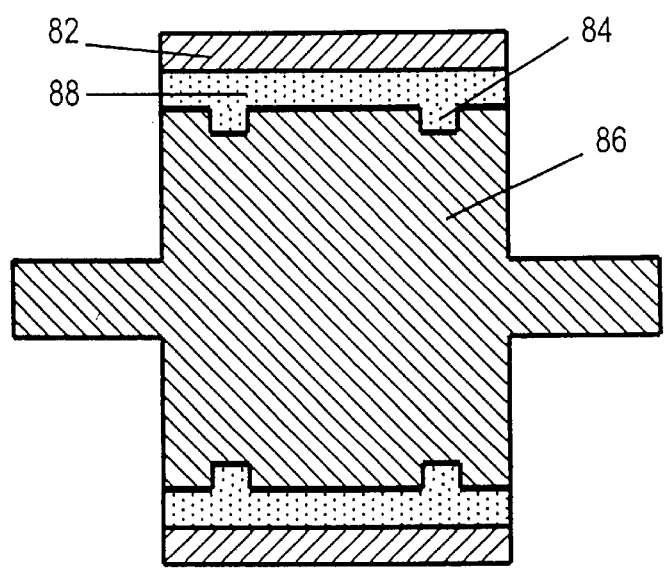
FIG. 10 is a cross sectional view showing a rotor of a other conventional example.

Fifth Exemplary Embodiment:

FIG. 8 is a cross sectional view showing the fifth exemplary embodiment of the present invention. The difference from the third exemplary embodiment is that, in this exemplary embodiment, the grooves 54 are formed at one side of the outer rotor rim side corners of the permanent magnet slits 53. With this structure also, the travels of the magnetic flux into the adjacent magnets are suppressed by the groove 54 as in the third exemplary embodiment, so that an effective reluctance torque is obtained.

As shown in FIG. 8, in another preferred embodiment of the invention, the plate shaped permanent magnets 32 have a trapezoidal cross section. Permanent magnet slits 53 having a trapezoidal cross section are formed inside the outer rim of the rotor core 31. Each slit 53 has a longer parallel side, a shorter parallel side, two beveled end sides, and four slit corners, and the longer parallel side is located radially outwards of the shorter parallel side. For each permanent magnet 32, a groove of low magnetic induction 54 protrudes from one of the slit corners facing the outer rim of the rotor core, and a plate thickness of each of the permanent magnets 32 is minimized at the outer slit corners. The grooves 54 are formed is a V shaped cross section having a base and rounded tip, and each grooves 54 is oriented so that the base extends between one of the beveled end sides and the longer parallel side of the slit and the tip is located radially outwards of the base.

The present invention as described above, in "an interior permanent magnet motor", by forming grooves at walls of permanent magnet slits formed inside the outer rim of a rotor core, and by forming adhesive layers in the grooves for sticking the inserted magnets to the rotor core, even if the slit size and the magnet section size are substantially same, since the adhesive remains at the grooves, the magnets are surely stuck to the rotor core.

And by forming grooves at the outer rotor rim side corners of the slits, the magnetic flux short circuit of the magnets themselves and the possible travels of the magnetic flux into the adjacent magnets are suppressed, so that a highly reliable, efficient motor with a high rotation speed is realized.

In the above exemplary embodiments, the magnets are set at one layer. However, the same effect is obtained on motors which have magnets at more than two layers, viz., on "a multi-layer interior permanent magnet motor". And also the same effect is obtained on the motor which has magnetic poles other than eight.

The present invention is explained connecting to various exemplary embodiments. However, the present invention may be embodied in the other forms without departing from the essential principle.

The exemplary embodiments of above description and the referred illustrations do not restrict the scope of the present invention. And also the above detailed exemplary embodiments do not restrict the scope of the appended claims.

What is claimed is:

1. A motor comprising:
   (a) a stator having a plurality of teeth provided with windings,
   (b) a rotating shaft disposed at the center part,
   (c) a rotor core fixed to said rotating shaft,
   (d) a plurality of permanent magnet slits formed inside the outer rim of said rotor core, and
   (e) permanent magnets inserted into said permanent magnet slits, wherein, said rotor core comprises:
      a plurality of magnetic plates laminated axially and having different numbers of grooves at the walls of said permanent magnet slits in such a manner as each adjacent plate is rotated by a predetermined angle maintaining a position agreement of said permanent magnet slits, and
      wherein adhesive layers are formed in said grooves for sticking said permanent magnets to said rotor core.

2. The motor as defined in claim 1, wherein said rotor core comprises:
   a plurality of core units laminated axially in such a manner as each adjacent core unit is rotated by a predetermined angle so that a position agreement of said permanent magnet slits is maintained,
   wherein, each of said core units comprises:
      a plurality of the magnetic plates laminated axially and having said grooves and said slits at the same locations on each plate.

3. The motor as defined in claim 2, wherein the grooves on an inside wall facing an inner rim of the rotor core are arranged along a rotating direction of the rotor so that a number of the grooves are different on adjacent slits and yet the number of the grooves are the same on the alternate slits.

4. A motor comprising:
   (a) a stator having a plurality of teeth provided with windings, and
   (b) a rotor having plate shaped permanent magnets therein, each permanent magnet having a trapezoidal cross section,
   wherein, said rotor comprised:
      (b-1) a rotating shaft disposed at the center part of said rotor,
      (b-2) a rotor core fixed to said rotating shaft,
      (b-3) permanent magnet slits formed inside the outer rim of said rotor core, each slit having a trapezoidal cross section including a longer parallel side, a shorter parallel side, two beveled end sides, and four slit corners, wherein the longer parallel side is locate radially outwards of the shorter parallel side, (b-4) grooves of low magnetic induction, wherein said grooves are formed in at least one of both slit corners facing the outer rim of the rotor core of each slit and one of the slit corners facing the outer rim of the rotor core of each slit, and (b-5) permanent magnets induction, wherein said permanent magnet slits;

wherein a plate thickness of each of the permanent magnets is at a minimum at the slit corners facing the outer rim of the rotor core, wherein an adhesive layer is provided in the grooves and between the permanent magnet and a wall of each slit, wherein said grooves have a V shaped cross section including a base and a tip, and wherein at each groove, the base extends between one of the beveled end sides and the longer parallel side of the slit and the tip is located radially outwards of the base.

5. A motor comprising:
(a) a stator having a plurality of teeth provided with windings, and
(b) a rotor having permanent magnets therein, wherein, said rotor comprises:
   (b-1) a rotating shaft disposed at the center part of said rotor,
   (b-2) a rotor core fixed to said rotating shaft,
   (b-3) permanent magnet slits formed inside the outer rim of said rotor core, wherein permanent magnet slits having grooves of low magnetic induction at both slit comers facing the outer rim of the rotor core are alternately disposed with permanent magnet slits having no groove along the rotating direction of said rotor, and
   (b-4) permanent magnets inserted into said permanent magnet slits;
   wherein an adhesive layer is provided in the grooves and between the permanent magnet and a wall of each slit.

6. The motor as defined in claim 5, wherein said grooves of the low magnetic induction are protruded toward the outer rim of the rotor.

7. The motor as defined in claim 4 or 5, further comprising grooves of low magnetic induction that protrude toward the inside of said rotor core.

8. The motor as defined in claim 4 or 5, wherein said grooves of the low magnetic induction are axially extended through.

9. The motor as defined in claim 4 or 5, wherein the wall of the slit is an inner wall facing an inner rim of the rotor core.

10. The motor as claimed in claim 9, wherein an adhesive layer is also formed between the permanent magnet and a wall of the slit that faces the outer rim of the rotor core.

* * * * *